United States Patent [19]

Straten

[11] Patent Number: 5,762,807

[45] Date of Patent: *Jun. 9, 1998

[54] COMPOSITION AND PROCESS FOR TREATING WATER AND GAS STREAMS CONTAINING HEAVY METALS AND OTHER POLLUTANTS

[76] Inventor: Günter Straten, Grosshejdstr. 228, D-52080 Aachen, Germany

[*] Notice: The term of this patent shall not extend beyond the expiration date of Pat. No. 5,451,327.

[21] Appl. No.: 527,554

[22] Filed: Sep. 13, 1995

Related U.S. Application Data

[63] Continuation-in-part of Ser. No. 972,479, Mar. 18, 1993, Pat. No. 5,451,327.

[51] Int. Cl.⁶ ........................................ C02F 1/62
[52] U.S. Cl. .................. 210/716; 210/721; 210/724; 210/906; 210/908; 210/912; 210/915; 252/175; 423/562; 423/565
[58] Field of Search .................. 210/716, 721, 210/724, 906, 908, 915, 912; 423/562, 565; 252/175, 180, 181

[56] References Cited

U.S. PATENT DOCUMENTS

| | | | |
|---|---|---|---|
| 1,685,895 | 10/1928 | Wood | 423/562 |
| 1,934,626 | 11/1933 | Nagelvoort | 423/562 |
| 2,094,939 | 10/1937 | Boulogne | 423/562 |
| 2,722,473 | 11/1955 | Toland, Jr. | 423/562 |
| 3,457,046 | 7/1969 | Hoekstra | 423/562 |
| 3,876,756 | 4/1975 | Romantschuk et al. | 423/562 |
| 4,500,324 | 2/1985 | Vuong . | |
| 4,624,790 | 11/1986 | Kamperman et al. . | |
| 4,640,832 | 2/1987 | Bittner et al. . | |
| 4,731,187 | 3/1988 | Moriya et al. . | |
| 4,765,913 | 8/1988 | Featherstone . | |
| 5,451,327 | 9/1995 | Straten | 210/716 |

FOREIGN PATENT DOCUMENTS

| | | |
|---|---|---|
| 0349671 | 10/1988 | European Pat. Off. . |
| 0154008 | 2/1982 | Germany . |
| 3822922 | 1/1990 | Germany . |
| 3917412 | 12/1990 | Germany . |

OTHER PUBLICATIONS

*Chemical Abstracts* 97: 147038e.
*Immobilisation, Entgiftung* . . . Martinez, p. 147.

Primary Examiner—Neil McCarthy
Attorney, Agent, or Firm—Michael de Angeli

[57] ABSTRACT

A composition for treating water or flue gases that contains metal ions and possibly also organic and/or inorganic compounds is produced by reacting sulfur with an alkali- and/or alkaline earth metal hydroxide in the presence of water.

The inventive composition corresponds to general formula I $$M_x S_y O_z \qquad (I)$$

where M represents an alkali or alkaline earth metal,
 x is 1 or 2,
 y is in the range 0.5x–4.0x, and
 z is in the range 0.1–2.5.

Alkali sulfite salts, particularly sodium salts, may also be added to the compound for reducing $H_2S$ emission.

25 Claims, 3 Drawing Sheets

COMPOSITION AND PROCESS FOR TREATING WATER AND GAS STREAMS CONTAINING HEAVY METALS AND OTHER POLLUTANTS

CROSS-REFERENCE TO RELATED APPLICATION

This application is a continuation-in-part of Ser. No. 07/972,479, filed Mar. 18, 1993, now U.S. Pat. No. 5,451,327.

FIELD OF THE INVENTION

The present invention relates to a composition for treating water containing metal ions and organic and/or inorganic impurities, and further relates to a method of manufacturing said composition, and to the use of said composition for removing toxic and nonferrous heavy metals and dissolved, suspended, or emulsified organic and/or inorganic components from aqueous systems. The inventive composition is also useful for removing heavy metals from flue gas streams.

BACKGROUND OF THE INVENTION

Toxic heavy metals and nonferrous heavy metals are widely used in all industrial countries as components of alloys in steels and as finishing or corrosion-resistant coating materials in combination with plastics and natural products. In modern manufacturing technologies, metals from the A groups and some of the heavy metals from groups III-B, IV-B, and V-B of the periodic table provide advantages but also present environmental discharge problems.

By conservative estimates, about 5% of the metal elements produced or used in manufacturing or treatment processes are left behind as residues or wastes, in pure form or in compounds, which residues and wastes cannot be economically reused by presently known methods. In addition to the economic considerations, whereby it would be desirable to be able to economically recover the valuable materials and thus reduce the costs and foreign exchange requirements for purchasing the raw materials, from an environmental standpoint it is also important to be able to reduce the disposal burden of toxic and nonferrous heavy metals, which metals are toxic to nearly all biological species.

The removal of toxic and nonferrous heavy metals from waste waters of the metal processing industry is currently accomplished primarily by classical hydroxide precipitation with sodium hydroxide, milk of lime, or, in special cases, sodium carbonate. Because of the wide pH range in which the hydroxides and oxyhydrates precipitate, and because of mixed reactions, i.e., reactions of disparate divalent metal ions with different ion radii, for each metal ion mixture it is necessary to carry out preliminary tests to determine empirically the optimal "compromise" pH value. Further, it is not possible to make exactly reproducible predictions concerning the precipitation process, because numerous factors affect and can interfere with the precipitation process. Hydroxide precipitation of toxic and nonferrous heavy metals has basically four additional inherent disadvantages:

1. The solubility products of the metal hydroxides are at least $10^7$–$10^{10}$ greater than those of the corresponding sulfides. The solubilities of the metal hydroxides thus are cumulative, depending on the matrix conditions of the solutions, up to values tens of millions of times higher than those of the corresponding sulfides.
2. The effect of neutral salts in the precipitation medium, which leads to increased solubility, is much stronger for hydroxide precipitation than for sulfide precipitation. Also, frequently neutral salts have deleterious effects on the sedimentation characteristics and the filterability of the precipitates.
3. Hydroxide precipitation of some of the toxic and nonferrous heavy metals is impossible or inadequate in the presence of complex-forming agents.
4. Metal hydroxides precipitated by classical methods cannot be reprocessed except by the use of difficult and costly methods.

Therefore, as a rule, heretofore, hydroxide sludges from the metal processing industry have been disposed of at high cost as special toxic wastes.

In contrast, the solubility products of most metal sulfides are so low that the metals can be precipitated quantitatively even from solutions containing strong complexes. Nonetheless, sulfide precipitation is rare in waste water treatment practice. One reason for this is the problems associated with the use of hydrogen sulfide, which is unpleasant smelling, toxic, and flammable; another reason is that most metal sulfides are difficult to remove to a satisfactory degree from the water phase.

In recent years, various organosulfides have been used in waste water purification practice. The organosulfides operate on the same principle as the sulfides, and precipitate, as sulfides, metals such as (among others) copper, cadmium, mercury, lead, nickel, tin, and zinc. However, organosulfides have the disadvantage that the allowable pH values are in the range >7, because in the acid domain ineffective free acids are produced.

It happens that the stability constants of numerous heavy metal complexes, particularly those of the type of the frequently used polyaminocarboxylic acids, are strongly pH-dependent, such that the complexes are more stable at higher pH values than in the acid range. Thus the only way to precipitate complexed metals using conventional technology is to employ a complicated process involving re-complexing by Fe (III) ions.

In the complete absence of complexing substances, and by strict adherence to the optimal operating conditions, it is possible to meet the new maximum concentration values prescribed by the 40th General Administrative Regulations Specifying Minimum Requirements for Discharge of Waste Water into Publicly Regulated Waters, pursuant to §7a of the German Water Management Law ("Wasserhaushaltsgesetz") with the use of hydroxide precipitation; however, a filtration step must be carried out following the precipitation. Such an overall process is costly, and does not assure constant adherence to the regulatory requirements, because the margin of safety between the achievable values and the regulatory limit values is only about 1.5–2.0. Therefore, quite small operating fluctuations lead to violation of the regulatory requirements.

In polysulfide precipitation of toxic and nonferrous heavy metals, one employs alkali and earth alkali polysulfides, instead of the toxic hydrogen sulfide. However, the polysulfide precipitating agents employed to date have had the disadvantage of low water-solubility, leading to high consumption of materials and high apparatus cost. Further, such agents are effective only with metal ions. There is a need for agents which can also remove, for example, pollutants of the mineral oil type.

OBJECTS OF THE INVENTION

It is therefore a principal object of the invention to provide a composition for treating water containing impurities, which composition is highly water-soluble;

causes precipitation of complexed and non-complexed metal ions, specifically toxic and non-ferrous heavy metal ions, and possibly organic or inorganic impurities, with very good separability of the precipitates;

is usable over a very wide pH range;

suppresses emission of hydrogen sulfide; and is very economical to manufacture.

It is a further object of the invention to provide methods for treating water and flue gases, specifically a method for removing toxic and non-ferrous heavy metals therefrom, employing the composition of the invention.

SUMMARY OF THE INVENTION

The above objects of the invention and needs of the art are satisfied by the present invention of a composition for treating water that contains metal ions and possibly also organic and/or inorganic compounds. The composition of the invention is produced by reacting sulfur with an alkali- and/or alkaline earth metal hydroxide in the presence of water.

According to the practice of the method of the invention, it is relatively easy to reduce pollutants to approximately ⅟10 of the maximum value permitted by the above-cited German law. Accordingly minor fluctuations in operation of the treatment apparatus do not lead to violations of the limits.

The concept underlying the production of the inventive composition is that of subjecting elementary sulfur to a disproportionation reaction by reacting sulfur with alkali- or alkaline earth metal hydroxides. Connected with this is an emphasis on bringing the maximum amount of sulfur into solution, and activating this dissolved sulfur.

The elemental composition of the inventive composition corresponds to general formula I $$M_x S_y O_z \qquad (I)$$

where M represents an alkali or alkaline earth metal, x is 1 or 2, y is in the range 1.5x–2.5x, and z is in the range 0.1–2.5.

In a preferred embodiment of the invention, M represents an alkali metal, particularly preferably sodium or potassium, more preferably sodium, x=2, y is in the range 1.5x–2.5x, particularly preferably 3.0–4.0, still more preferably 3.4–3.8, most preferably 3.6, and z; is in the range 0.1–2.5, particularly preferably 0.3–1.5, still more preferably 0.5–1.0.

In certain embodiments of the invention, an aluminum salt, a thiosulfate, or a sulfite may additionally be added. The sulfite may preferably be added as an alkali sulfite salt, particularly a sodium sulfite. In this case, the molar ratio of alkali metal or alkaline earth metal and sulfur in useful formulations of the compound of the invention is broadened to 0.5–4.0:1, and $H_2S$ emissions are further reduced.

The composition of the invention is mixed with streams to be purified to precipitate pollutants therefrom, but may also be sprayed into flue gas to precipitate heavy metals therefrom.

BRIEF DESCRIPTION OF THE DRAWINGS

Additional advantages, features, and application possibilities of the invention will be apparent from the following descriptions of exemplary embodiments in combination with the drawings, wherein.

DESCRIPTION OF THE PREFERRED EMBODIMENTS

Figure 1:
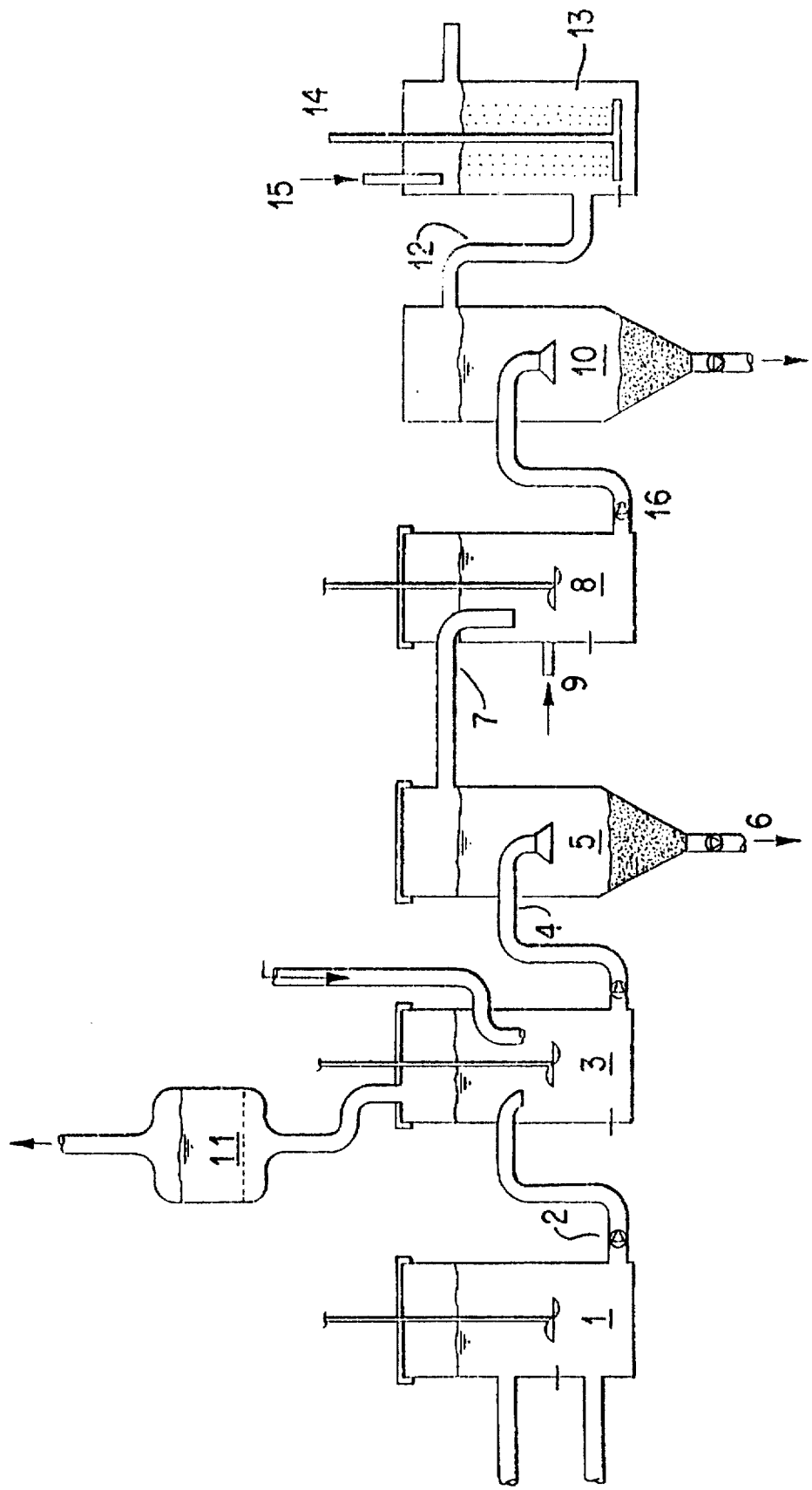
FIG. 1 shows use of the inventive compound in a pH-fractionated staged precipitation process.

It has been discovered by the present inventor that when sulfur is treated with an alkali- or alkaline earth metal hydroxide in the presence of water, a composition is obtained which: 1) is highly water soluble; 2) causes precipitation of complexed and non-complexed metal ions, particularly toxic and non-ferrous heavy metal ions, as well as possibly organic or inorganic impurities, with very good separability of the precipitates; 3) is usable over a wide pH range; 4) suppresses emission of hydrogen sulfide; and 5) is very economical to manufacture.

The inventive composition corresponds to general formula I $$M_x S_y O_z \qquad (I)$$

where M represents an alkali or alkaline earth metal, x is 1 or 2, y is in the range 1.5x–2.5x, and z is in the range 0.1–2.5.

In a preferred embodiment of the invention, M represents an alkali metal, particularly preferably sodium or potassium, more preferably sodium, x=2, y is in the range 3.0–4.0, more preferably 3.4–3.8, most preferably 3.6 and, z is in the range 0.1–2.5, particularly preferably 0.3–1.5, still more preferably 0.5–1.0.

Mass spectrographic analysis by HPLC-MS-MS (thermospray double mass spectrometry) of such an inventive composition indicates that the composition is comprised of reduced and oxidized sulfur compositions. For example, the composition of the invention contains polysulfide components, polysulfane components, and mono-, di-, and trisulfonates, as well as sulfur; the sulfur may be present as elemental dissolved sulfur.

In a second preferred embodiment, the inventive composition contains an aluminum salt. Aluminum has an amphoteric character, which results in different behavior in alkaline and acid media. If an aluminum salt is added to the composition, aluminates form in alkaline media, while $Al^{+3}$ ions are present in acid media. In neutral and weakly alkaline waste waters (up to pH 8.8), voluminous strongly adsorptive hydroxides are formed which, among other things, remove sulfur still present in colloidal form in the waste waters, by flocculation. The hydroxide which forms as neutralization increases (pH >7) carries the dissolved sulfur (which may be present in part in colloidal form) with it as it precipitates. This effect is reversed again in more strongly alkaline media (pH >9) because the aluminum ions then go into solution. Preferred aluminum salts are aluminum sulfate and aluminum chloride, particularly the former. This after-precipitation effect in weakly alkaline waste waters is well suited to eliminate the so-called "colloidal sulfur turbidity" which often survives following treatment of waste waters.

Preferably the inventive composition contains 10–30 g, particularly preferably 15–25 g, still more preferably 18–22 g, of aluminum sulfate per liter of the composition.

In another preferred embodiment of the invention, a thiosulfate or sulfide is added to the composition which is obtained. These substances increase the $O_2$ and $SO_2$ content of the inventive composition, and thereby promote the well-known "Wackenroder interception reaction", by direct formation of polythionic acids ("Wackenroder liquid") and polysulfane oxides ("Wackenroder sulfur") from $SO_2$ and $H_2S$.

In a still further embodiment, sulfites are added to the composition of the invention. Sodium sulfites such as $Na_2SO_3$, $NaHSO_3$, and $Na_2S_2O_5$ are preferred. When sulfites are used, the useful molar ratio of alkali or alkaline earth metal to sulfur is broadened to between 0.5 and 4.0:1, and $H_2S$ emissions from water treated using the composition of the invention are reduced.

The process according to the invention for producing the inventive composition employs water, sulfur, and alkali metal hydroxide and/or alkaline earth metal hydroxide in a molar ratio of 4.0–6.5:1.0–3.0:1, preferably 5.0–6.0:1.5–2.5:1, particularly preferably 5.4–5.6:1.7–1.9:1, and still more preferably 5.6:1.8:1. The order of addition of the reactants is of subsidiary importance. However, in a particularly preferred embodiment of the process of the invention the sulfur is first added to the water while stirring, to form a slurry with good surface wetting of the sulfur particles, and then the alkali or alkaline earth metal hydroxide is added, under intensive further stirring.

In the first 2–10 minutes after addition of the alkali- or alkaline earth metal hydroxide, an initial temperature of 62° C. needed for the reaction of the sulfur is reached as a result of the exothermal hydration of the added hydroxide. The sulfur slurry then dissolves slowly with a further rise in temperature. Depending on the volume of the reaction mixture and the shape and type of container, this process proceeds for 5–40 minutes. In general, after complete dissolution of the sulfur, a limiting temperature of 98°–104° C. is established in the container; the exact temperature reached depends on the radiative heat losses from the container.

After completion of the reactions the inventive composition is present in the form of a deep red liquid which is nearly odorless when allowed to cool for a time and subjected to further stirring. This inventive solution comprises polysulfide components, polysulfane monosulfonates, polysulfane disulfonates, and elemental dissolved sulfur. The distribution of the sulfur-containing groups in the resulting solutions is, for example, as follows:

1. Polysulfide components:
   $S_2^{-2}$ 17–21%; $S_3^{-2}$ 4–8%; $S_4^{-2}$ 15–21%;
   $S_5^{-2}$ 3–7%; $S_6^{-2}$ 12–18%; $S_8^{-2}$ 10–14%;
2. Polysulfane monosulfonates (% as sulfur):
   $S_2O_3^{-2}$ 11–16%; $S_4O_3^{-2}$ 6–10%;
3. Polysulfane disulfonates (% as sulfur):
   $S_4O_6^{-2}$ 1–5%;
4. Elemental dissolved sulfur:
   rings $S_6$ and $S_8$ 0–3%.

The solutions thus obtained have, for example, the following parameters:

Density (20° C.): 1.10–1.60 g/cc.
Vapor pressure (20° C.): 15.5–17.0 mbar.
Viscosity (20° C.): 6.30–7.20 sq mm/sec
by DIN 51 562: 9.0–10.5 mPa-sec
Boiling point at 1013 mbar: 105°–111° C.
Crystallization point: −19.5° to −23° C.
Solubility in water: Unlimited.
pH (at 10 g/L): 10.0–14.0.

Further, it is particularly advantageous if the sulfur contains an additive, e.g., silicic acid, to prevent or inhibit caking and encapsulation.

A critical factor for effectiveness of the inventive composition in large industrial precipitation facilities is that it can be uniformly and rapidly distributed. Accordingly, it may be advantageous to dilute the compound after production, for example, by adding a certain amount of water. The resulting solution is much less viscous, and thus is easier to distribute in the precipitation vessel than is the concentrate.

The parameters of an inventive Na-polysulfide composition which is produced as prescribed and then diluted with twice its volume of water are, for example, as follows:

Form: liquid Color: red-orange Odor: odorless
Density (20° C.): 1.165 g/cc.
Vapor pressure (20° C.): 21.7 mbar.
Viscosity (20° C.): 1.51 sq mm/sec
by DIN 51 562 1.76 cp
Boiling point at 1013 mbar: 102.2° C.
Crystallization point: −7.4° C.
Solubility in water: Unlimited.
pH (at 10 g/L): 12.3.

The thus diluted product contains 14.57% sulfur=4.54 mol/kg, of which 75% is in polysulfide form.

This corresponds to 10.93% (109.3 g/kg, or 3.41 mol/kg) of polysulfide-activated sulfur.

Studies of pure, matrix-free metal salt solutions of toxic and nonferrous heavy metals have shown that the amount of sulfur by the inventive composition is that required for an optimum precipitation effect for divalent metal ions. This demonstrates that all of the sulfur used in producing the claimed composition was also activated.

The inventive composition may be regarded as a "liquid condensed" substitute for hydrogen sulfide, having the advantages of hydrogen sulfide without the disadvantages. Theoretically, in its precipitation action, 1 kg of the 3:1 aqueous dilution of the concentrated inventive composition corresponds to 102 liters of hydrogen sulfide. Because of the poor dissolution rate of $H_2S$ gas into aqueous systems, only about 15% of the gas added is dissolved in the liquid, and thus with hydrogen sulfide only 15% of the input is usable for precipitation. In contrast, nearly 100% of the activated sulfur in the inventive composition is usable in the precipitation vessel. Thus in practice 1 kg of the inventive composition diluted 3:1 in water is effectively equivalent to about 600 liters of $H_2S$. These figures indicate the substantial advantages afforded by the inventive precipitation agent in comparison to hydrogen sulfide.

The polysulfonates contained in the claimed composition, particularly the monosulfonate ($S_2O_3^{-2}$), are especially important. They enable excess free hydrogen sulfide which arises in acid solution to be directly chemically bound in the solution, via the Wackenroder interception reaction. In this way, emissions of unpleasant-smelling and toxic hydrogen sulfide can be essentially completely suppressed. In this connection, reference is made to the above-mentioned molar ratios of sulfur, water, and alkali- and/or alkaline earth metal hydroxide, because these ratios determine the disproportionation reaction of sulfur and thereby directly influence the ratio of reduced to oxidized sulfur compounds, particularly the concentration of monosulfonate, in the claimed composition.

According to the method of the invention, the composition of the invention can be used for treating waters containing metal ions and possibly also organic and/or inorganic compounds. Toward this end, the inventive composition, possibly along with an inorganic compound containing a multivalent cation, is added to the waters containing soluble metal ions and possibly also organic and/or inorganic impurities, and the pH is adjusted to values in the range 2–12.

The ratio of the inventive composition to the waste waters is set such that there is an equimolar correspondence between activated sulfur and the metal ions to be precipitated. An advantageous ratio for practical purposes is 1:1000 by volume.

According to a particularly preferred embodiment, the pH of the water to be purified is adjusted prior to the treatment with the claimed composition to a value of 2.5–5.5, preferably 3–3.5. A pH below 3.0 is not particularly advantageous, because when the inventive composition is added under such conditions, particularly when air injection lances are used for agitation of the solution, large amounts of hydrogen sulfide pass into the gaseous state.

If the water to be purified includes readily releasable cyanides when open treatment apparatus is used, highly toxic hydrocyanic acid is liberated. If the waters do contain such cyanides, a preliminary stage of cyanide detoxification is required.

The inventive composition may be used, for example, in a pH-fractionated sequential precipitation process. This mode of practice of the process of the invention is particularly well suited for separating sulfides which precipitate in acid media from those which precipitate in neutral and/or alkaline media, where the metals are to be subsequently processed in the course of recycling. In particular, in some areas of the electroplating industry, for example, the composition of the invention may be advantageously used for pre-separation of copper- and nickel-sulfides. In this way, among other things, valuable metals can be recovered from spent nickel plating baths.

The use of the inventive composition in a pH-fractionated staged precipitation process is described first, with reference to FIG. 1.

The waste waters undergoing treatment are brought to pH 2–5, preferably 2.5–4, particularly preferably 2.8–3.3, in an acidification vessel 1, by addition of, for example, a mineral acid, preferably hydrochloric acid. Then an amount of the inventive composition prepared according to the description above is added, under stirring, possibly after dilution. The mixture is then passed through a line 2 into an acid precipitation vessel 3, in which it is stirred for the duration of the reaction. The solution is then passed through a line 4 into an acid settling vessel 5. Depending on the metal ions contained in the waste water, a white, gray, or black precipitate will be observed. This precipitate has an initially colloidal milky component attributable to elemental sulfur. The precipitate from the acid precipitation process is drawn off through a line 6, and the supernatant is passed via a line 7 into a stirred neutralization vessel 8. Here the pH is adjusted to 3.5–4.5, preferably 3.8–4.2, with addition of, for example, sodium hydroxide, from line 9. After a reaction time of approximately 5–20 minutes, any acid precipitates which form are removed into an intermediate settling vessel (not shown in FIG. 1). The supernatant is then adjusted to pH 6–12, preferably 7–10, particularly preferably 7.8–9.6, with addition of additional sodium hydroxide and possibly a precipitation aid such as a polyelectrolyte (depending on the metal ions present). Then the mixture is; passed via line 16 into an alkali settling vessel 10. After a reaction time of 5–20 minutes, any metal sulfide precipitate forming in the alkaline medium is separated out.

In the event a very large amount of the inventive composition is required, the pH may be desirably adjusted in the waste water undergoing purification in the acidification vessel 1 to a value in the range 2.0–3.5, preferably 2.3–2.8.

In enclosed places, the acid reaction vessels should be covered, as a low level of $H_2S$ may be emitted; the air exhaust can be treated in an alkaline oxidative exhaust air purification apparatus 11. The $H_2S$ emissions in all precipitation tests which have been conducted have been below the German maximum allowable concentration value of 10 ppm in the exhaust air.

Depending on the need for an excess of precipitation agent, it may be advantageous to subject the purified water phase to oxidative post-treatment in order to oxidize and remove residual amounts of reduced sulfur, and thereby to meet legal limits on sulfide effluent before discharging the purified water into sewers, storm sewers, or outfalls. For this purpose, the supernatant of an alkali settling vessel 10 is passed through a line 12 into a container 13 for oxidative post-treatment. Element 14 represents, for example, an oxygen lance, for supplying oxygen to assure full oxidation. The pH of the purified water may also be adjusted to 6.5–8.0 by, for example, addition of a mineral acid, preferably hydrochloric acid, through the line 15.

According to a further aspect of the invention, the inventive composition may also be used in a simultaneous precipitation process to treat water containing metal ions and possibly also organic and/or inorganic compounds. The inventive composition is useful for such treatment when the amounts of metals in the water undergoing purification are small, and the metal ions all precipitate in the same pH range, so that it is not necessary to employ a pH-fractionated staged precipitation process with recycling.

Figure 2:
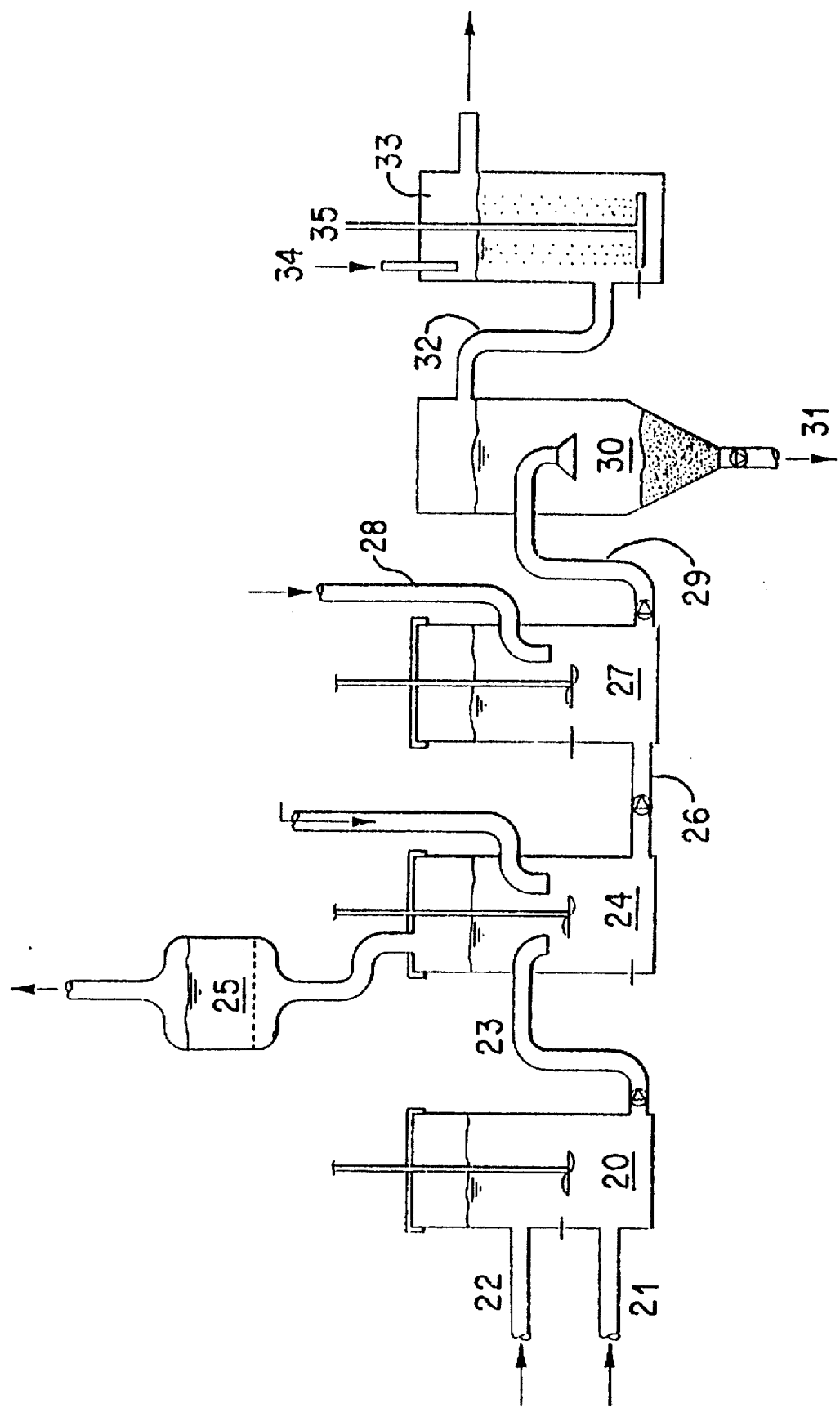
FIG. 2 shows use of the inventive compound in a simultaneous precipitation process.

The use according to the invention of the inventive composition in such a simultaneous precipitation process will be described with reference to FIG. 2. As in the staged process of FIG. 1, the pH of the precipitation medium is adjusted to 2.5–5.5, preferably 2.8–3.3, in an acidification vessel 20, by addition of, for example, a mineral acid, preferably hydrochloric acid, from a line 21. Then an amount of the inventive composition corresponding to that used in the preceding embodiments is introduced into the vessel 20 via a line 22, while stirring. The mixture is then passed through a line 23 to an acid precipitation vessel 24 and stirred for 5–30 minutes.

The exhaust gases from the acid precipitation vessel 24 may, as mentioned previously, be treated to avoid hydrogen sulfide emissions by means of an alkali oxidative exhaust gas purification apparatus 25.

The mixture is then passed through a line 26 into the neutralization vessel 27. By addition of, for example, alkali from line 28, the pH of the precipitation medium is slowly raised to between 6 and 12, preferably 7.5–11.5.

In practice of this process at pH values up to 8.3, the metal sulfides which precipitate in neutral and weakly alkaline media will precipitate out substantially completely. pH 8.3 is the optimum point for precipitation of the difficultly soluble chromium (III) hydroxide. If nickel and zinc ions are present, the pH end value is preferably adjusted to 8.0–11.5, preferably 9.0–11.0, particularly preferably 9.5–9.7. A pH in the range 8.0–11, preferably 9–10, particularly preferably 9.6, is the empirically determined optimum for the simultaneous minimum residual solubility of these two metal sulfides. If the pH end point is 9.6, the residual contents of nickel and zinc dissolved in water are each below 0.1 mg/l.

After addition of the alkali metal hydroxide, the mixture is passed through a line 29 into a settling vessel 30, from which the settled precipitates are withdrawn through line 31, and the purified supernatant is passed out through a line 32, possibly to a vessel for oxidative post-treatment 33, as discussed generally above. As in the staged precipitation process, a mineral acid may be added from a line 34, to establish a pH in the range of, for example, 6.5–8.0. The device 35 in the vessel for oxidative post-treatment 33 may be, for example, an oxygen lance.

When the inventive composition is used in the simultaneous precipitation process just described, one should take into account the matrix characteristics of the impurity-containing waters, with regard to components with complexing properties and other properties which inhibit precipitation.

If the metal sulfide sludges are not to be processed for reuse, neutralization may be performed in the neutralization vessel 27, preferably using, for example, sodium hydroxide, and particularly preferably using a suspension of calcium hydroxide in lime water (milk of lime), to improve the settling behavior and dewaterability of the precipitates, e.g. in chamber filter presses.

According to the invention it is also possible to use a so-called collector precipitation process, rather than merely a staged precipitation process or a simultaneous precipitation process, to treat water containing metal ions and possibly also organic and/or inorganic compounds. In this use of the inventive composition, the simultaneous precipitation process described above is modified, particularly for aqueous phases containing metal ions and complex-forming components, and especially aqueous phases containing organic and/or inorganic impurities such as mineral oils, paraffins, emulsifiers, or surfactants (ionic or nonionic). If the waste waters to be purified have only metal ion impurities, excellent purification results are obtained with the collector precipitation process described hereinbelow with reference to FIG. 3. It is understood that the process may be employed for purification of other waters, however. The precipitation results obtained in the staged and simultaneous precipitation processes are appreciably exceeded by the collector precipitation process according to the invention. Moreover, process stability is very high. In operations to date, no impurity levels exceeding the established. 0.1 mg/l tolerances (0.01 mg/l for cadmium) have been measured.

In addition to high process reliability in eliminating precipitatable metals, impurity removal levels of greater than 99.5% have been determined for waters contaminated with impurities of the mineral oil type and with oil emulsifiers based on surfactants. In every case, residual oil levels in the aqueous phase have been below 10 mg/l, which is the new limit value of the German water law discussed above.

Figure 3:
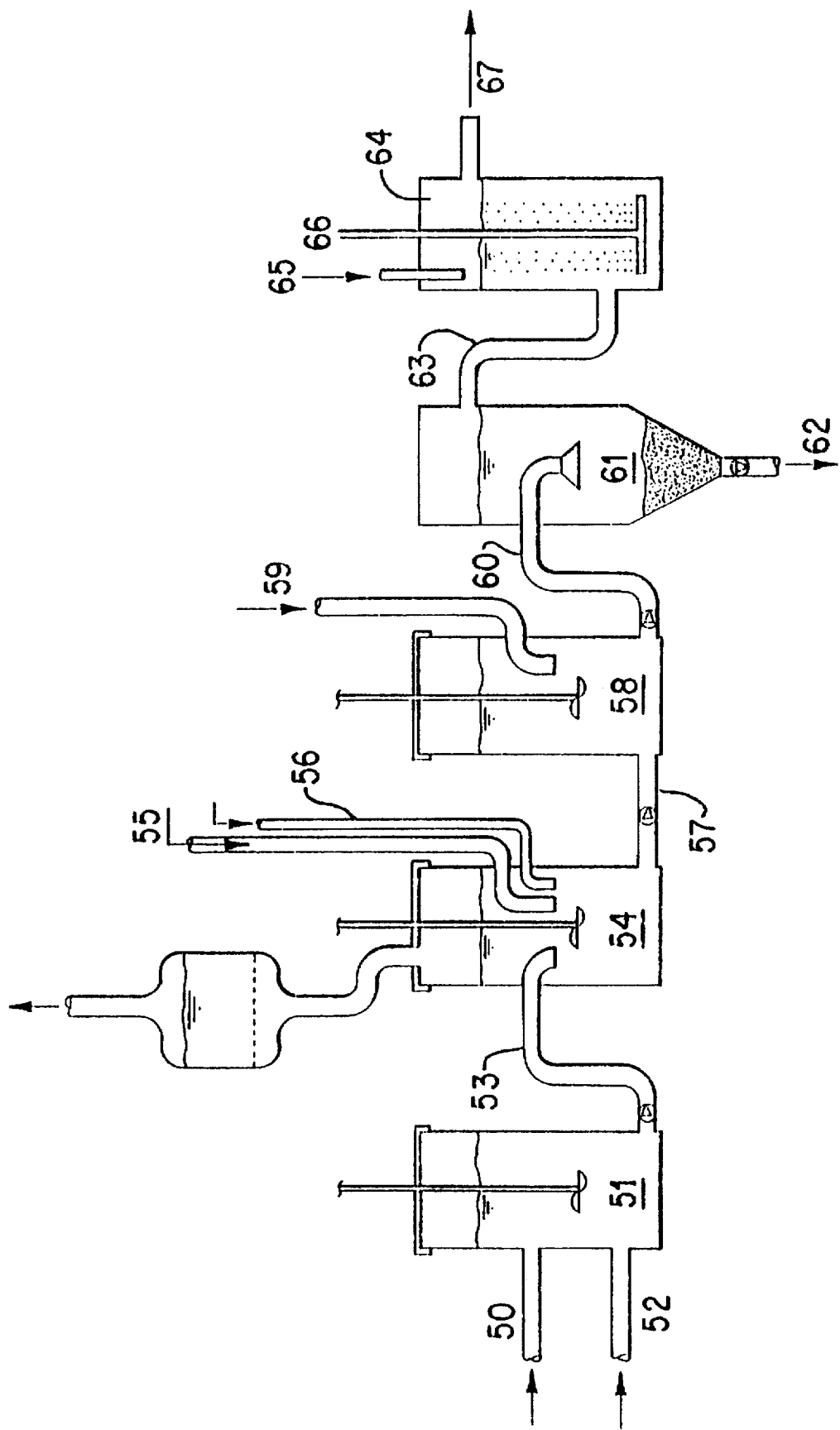
FIG. 3 shows use of the inventive compound in a collector precipitation process.

In practice of the collector precipitation method of the invention, as shown in FIG. 3, the waters to be purified are charged to an acidification vessel 51 via a line 50, and are adjusted to pH 2–5, preferably 2.5–3.5, particularly preferably 2.9–3.2, by adding, for example, a mineral acid, preferably hydrochloric acid, through line 52 under stirring. Then the acidified waste waters undergoing treatment are passed through line 53 into an acid precipitation vessel 54, where first an-inorganic compound containing a multivalent cation is added through line 55. The compound added may be a calcium, aluminum, or iron compound, preferably an iron compound, particularly preferably iron (II) sulfate. In a particularly preferred embodiment, a weak sulfuric acid iron sulfate solution with a concentration of ⅓ mol $Fe^{+2}$/L (approximately 18.5 g/l) is used. However, iron (III) salts may also be used. After addition of the inorganic compound containing a polyvalent cation, iron in the example, the inventive composition is added by line 56. Due to the iron addition, more of the claimed composition is added than in the simultaneous precipitation method, i.e., 1–5 mol more of the inventive composition is added per cubic meter of water to be purified, preferably 2–4 mol more, particularly preferably 2 mol more.

The compound containing a multivalent cation may be added either before or after the addition of the inventive composition, but preferably before.

The mixture is then passed through line 57 to a neutralization vessel 58 wherein, following a reaction time of 5–30 minutes, an alkali, preferably, for example, sodium hydroxide or milk of lime, is added through line 59. Milk of lime is used particularly if the sludges are not to be recycled, because it provides better dewaterability of the sludge.

During the neutralization, a pH in the range of 8.0–11.0, preferably 9.0–10, particularly preferably 9.5–9.7, is established. A pH in the middle range of 9.0–10.5 is preferred when the method of the invention is employed for simultaneous precipitation of nickel sulfide and zinc sulfide.

From a pH in the range of 5.0–6.0 the added iron ions are precipitated in the form of black iron sulfide, and other metal sulfides, as well as organic and/or inorganic impurities, are precipitated along with these.

The alkaline mixture is passed via a line 60 into a settling vessel 61, where the settled sulfide sludge may be withdrawn through a line 62, with the supernatant being sent via a line 63 to a vessel 64, for example for oxidative post-treatment. One may add, for example, a mineral acid, preferably hydrochloric acid, via a line 65, to establish a pH in the purified waste waters of, for example, 6.5–8.0. An oxygen lance 66 is used for the oxidative post-treatment. The purified water exits the collector precipitation system via the exit line 67.

The inorganic compound containing a multivalent cation (preferably iron (II) sulfate), or its metal ions, works in combination with the inventive composition to accelerate the precipitation in the neutral and alkaline range, while the organic and/or inorganic impurities are adsorptively co-precipitated from the subject water. At the same time, the polysulfide components of the inventive composition, which are present in excess in the acid medium, are depleted in the aqueous phase due to the iron sulfide precipitation, which in turn minimizes the re-dissolution effect of acid-precipitated heavy metal sulfides and acid-precipitated nonferrous metal sulfides.

The catalytic "collector" activity brought about by the combination of the inventive composition and the added multivalent cations is explainable by the following six phenomena:

1) The sulfides which precipitate in relatively large quantities carry along other sulfides and possibly additional impurities (the carrying or "piggyback" effect).

2) Oversaturation effects are triggered.

3) Mixed crystal formation occurs, such as is known, for example, in the case of mercury sulfide and cadmium sulfide (HgS/CdS).

4) Covalent bond formation of sulfides, such as is known, for example, for copper iron sulfide ($CuFeS_2$), has been observed.

5) Purely catalytic acceleration of the precipitation of nickel sulfide and zinc sulfide occurs in the presence of iron sulfide.

6) In the acid range, iron (II) ions displace nickel ions quantitatively from most complex compounds.

Customarily, chromium (VI) ions have been removed from aqueous systems by reduction with alkaline bisulfite (NaHSO$_3$ solution) to form chromium (III), with subsequent precipitation by neutralization in the pH range 7.5–8.5.

When the inventive composition is used in any of the above-described staged, simultaneous, or collector precipitation processes according to the invention, the chromium (VI) ions are reduced by the polysulfanes contained in the compound of the invention. The amount of reducing agent required from the inventive composition is only ¼ that of the amount of sulfur required when provided from the alkaline bisulfite, because there are 8 oxidation units from sulfide to sulfate, but only 2 oxidation units from sulfite to sulfate. Other advantages are avoidance of unpleasant sulfur dioxide emissions and a substantially lesser degree of salting of the medium as a result of the reduction process. The chromium (III) is then coprecipitated (as the difficultly soluble Cr(OH)$_3$) during the above-described exemplary embodiments of use of the inventive composition, at a pH in the range 8.0–10, preferably 8.3–9.6. In every case of use of the inventive compositions, the residual chromium (III) in the subject water has been <0.1 mg/l, and the chromium (VI) content has been <0.01 mg/l, that is, undetectable by the most sensitive methods.

The toxic and nonferrous heavy metal sulfides precipitating with the use of the inventive composition may be separated out in customary fashion by sedimentation. For cases other than the hydroxide sludges produced in typical waste water purification processes used in the metal processing and electroplating industries, which sludges contain large excess amounts of calcium due to use of lime in precipitation, and also contain phosphate and fluoride, the sulfides can be dewatered, neutralized with sodium hydroxide, roasted, and fed directly into the normal metal smelting process for recovering the metal, with such recycle feed ordinarily being a portion of the overall feed mass. They represent valuable, readily usable metal concentrates. Thus, in principle the metals can be readily and completely recovered. This is particularly significant if it is necessary or desirable to produce separate heavy metal waste waters with a uniform composition, wherewith practically pure metal sulfides are precipitated (containing besides the metal essentially only sulfur, which does not interfere with the subsequent processing).

Also, it is relatively easy to separate the less valuable iron sulfides and zinc sulfides from the copper sulfides and nickel sulfides, namely by acid treatment with simultaneous recycling of the hydrogen sulfide produced. Use of the inventive composition in such a system provides not only high operational safety and simple operation, but also the possibility of good recovery of the valuable materials, as is favored by the German law in particular, as well as by the laws of many other countries.

PRODUCTION EXAMPLE 1

Into a container with a capacity of at least 1.2 cubic meters, 500 liters of water (27.75 kmol) was charged. Then 290 kg sulfur (9.044 kmol) containing an additive of silicic acid (Aerosil) was added slowly, while stirring to form a slurry. Stirring was continued for an additional 10 minutes, following which 200 kg (5 kmol) sodium hydroxide in flake form was added under intensive additional stirring. After 6 minutes, the initial temperature of 62° C. needed for reaction with the sulfur was reached, due to the heat of hydration of the sodium hydroxide. After stirring for another 25 minutes, the sulfur had completely dissolved. After complete dissolution of the sulfur, 20 g aluminum sulfate per liter of the mixture was added. The inventive composition was obtained in the form of a dark yellow to deep red liquid which was nearly odorless after being allowed to cool for several hours under further stirring. The proportions of various sulfur groups representing the sulfur in this inventive composition were as follows (total 100%):

1. Polysulfide components:
   $S_2^{-2}$ 19%, $S_3^{-2}$ 6%, $S_4^{-2}$ 18%, $S_5^{-2}$ 5%, $S_6^{-2}$ 15%, and $S_8^{-2}$ 12%.
2. Polysulfane monosulfonates (% as sulfur):
   $S_2O_3^{-2}$ (thiosulfate) 13%, $S_4O_3^{-2}$ 8%.
3. Polysulfane disulfonates (% as sulfur):
   $S_4O_6^{-2}$ (tetrathionate) 3%.
4. Elemental dissolved sulfur: Ring form ($S_6$, $S_8$) 1%.

The thus obtained inventive composition had the following characteristics:

Form: liquid. Color: red-orange. Odor: weakly thio-like.
Density (20° C.): 1.399 g/cc.
Vapor pressure (20° C.): 16.4 mbar.
Viscosity (20° C.): 6.94 sq mm/sec
by DIN 51 562 9.70 mPa-sec (9.70 cp).
Boiling point at 1013 mbar: 109.7° C.
Crystallization point:. −21.8° C.
Solubility in water: Unlimited.
pH (at 10 g/L): 12.5.

PRODUCTION EXAMPLE 2

Into a reaction vessel with a capacity of at least 1.2 cubic meters, 500 liters of water (27.75 kmol) was charged. Then 290 kg sulfur (9.044 kmol) containing an additive of silicic acid (Aerosil) was added slowly, under stirring to form a slurry. Stirring was continued for an additional 10 minutes, following which 280.5 kg (5 kmol) potassium hydroxide was added quickly, under intensive additional stirring. After 7 minutes, the initial temperature of 62° C. needed for reaction with the sulfur was reached, due to the heat of hydration of the potassium hydroxide. After stirring for another 25 minutes, the sulfur added had completely dissolved. The inventive composition was obtained in the form of a deep red liquid, which was nearly odorless after being allowed to cool for several hours under further stirring. The proportions of the various sulfur-containing groups in the inventive composition (based on the total sulfur) were as reported above.

PRODUCTION EXAMPLE 3

Into a reaction vessel with a capacity of at least 1.2 cubic meters, 500 liters of water (27.75 kmol) was charged. Then 290 kg sulfur (9.044 kmol) containing an additive of silicic acid (Aerosil) was added slowly, while stirring to form a slurry. Stirring was continued for an additional 10 minutes, following which 291.65 kg (5 kmol) magnesium hydroxide was added as quickly as possible, under intensive additional stirring. After 7 minutes, the initial temperature of 62° C. needed for reaction with the sulfur was reached, due to the heat of hydration of the magnesium hydroxide. After stirring for another 35 minutes, the sulfur added had completely dissolved. The inventive composition was obtained in the form of a deep red liquid, which was nearly odorless after being allowed to cool for several hours under further stirring. The proportions of the various sulfur-containing groups in the inventive composition (based on the total sulfur) were as reported above.

PRODUCTION EXAMPLE 4

Into a reaction vessel with a capacity of at least 1.2 cubic meters, 500 liters of water was charged. Then 290 kg sulfur (9.044 kmol) containing an additive of silicic acid (Aerosil) was added slowly, while stirring to form a slurry. Stirring was continued for an additional 10 minutes, following which 374.00 kg (5 kmol) calcium hydroxide was added quickly, under intensive additional stirring. After 6 minutes, the initial temperature of 62° C. needed for reaction with the sulfur was reached, due to the heat of hydration of the calcium hydroxide. After stirring for another 37 minutes, the sulfur added had completely dissolved. The inventive composition was obtained in the form of a red liquid, which was nearly odorless after being allowed to cool for several hours under further stirring. The proportions of the various sulfur-containing groups in the inventive composition (based on the total sulfur) were as reported above.

Further Improvements

According to further experiments carried out after filing of the parent application, it has been discovered that addition of sulfite ions is beneficial in certain cases. Moreover, it has been discovered that the composition of the invention can be used in removing heavy metal ions from flue gas streams from incinerators and the like.

More specifically, it has been found that addition of sulfite ions significantly broadens the useful S:OH range of the composition of the invention, while further reducing $H_2S$ emissions. The sulfite can be added as an alkali sulfite salt, particularly a sodium salt, such as sodium sulfite ($Na_2SO_3$), sodium hydrogen sulfite ($NaHSO_3$), or sodium disulfite ($Na_2S_2O_5$). Typically, the sulfites are added in a molar ratio of 0.1–2.5 mols per liter of the composition of the invention, when in concentrated form, typically in solution at a pH of 11.0. The sulfite is simply added to the composition of the invention when it has cooled to less than 80° F. after the reaction between elementary sulfur and sodium hydroxide. A particularly preferred ratio is 1.0–1.5 and especially 1.35 of sulfite mols per liter of concentrated solution. Where this composition is used to treat polluted water in a pH range of 1.0 to 3.0, the hydrogen sulfide emissions are reduced by a factor of 10; if the water is in the pH range of 3.0 to 4.5, the hydrogen sulfide emissions are practically zero. Furthermore, by incorporating sulfite ions into the inventive compound as above, the usual sulfur cloudiness associated with treatment levels of 0.8 to 5.0 kg of the inventive compound to one liter of waste water is not present. This is due to increased production of a variety of dissolved polythion acids (that is, a variety of acids formed between the sulfite ions and $H_2S$, not susceptible of specific analysis), which improve flocculation of the waste water. Finally, addition of sulfites as above allows the effective S:OH ratio of the composition of the invention to be broadened to between 0.5 and 4.0:1, while resulting in greater pollutant precipitation efficiency and lower emissions of hydrogen sulfide in acid waste waters.

In a further improvement provided according to the present continuation-in-part invention, the compound of the invention (with or without sulfites added) can be used for removing heavy metals from gaseous media, such as flue gases emanating from power plants, incinerators, and other high temperature production facilities. The inventive compound is sprayed into the flue gas, precipitating the heavy metal ions as a fine dust, which may be removed in a baghouse or similar particulate removal device.

Depending on the concentration of the metals in the flue gas and their chemical state, expressed by their oxidation number, the mol ratio at which the inventive composition is added to a flue gas stream including heavy metals may be between 3:1 and 15:1. As will be appreciated by those of skill in the art, a most difficult precipitation problem with respect to flue gases occurs with mercury pollutants. Mercury is typically present in flue gas in three oxidation states ($Hg^0$, $Hg^{+1}$, $Hg^{+2}$). The amount of inventive compound to be added to the flue gas has to be adapted to the distribution of the Hg ions by experimentation. The mole ratio of the compound added may range between 3–15 mols to each mole of Hg ions, with a preferred molar ratio of 5.5:1, that is, mols compound:mols Hg. Given the correct dosage, the Hg concentration level is reduced to a level as low as 10 micrograms per cubic meter of gas, that is, effectively to the minimum detection limit. Moreover, the inventive compound can be added to flue gases in wet or dry flue gas scrubbing systems.

While several preferred embodiments of the inventive composition as well as its method of preparation and methods for its use in treating water have been described in detail, the invention is not limited thereby, but only by the following claims.

What is claimed is:

1. A composition for treating water containing one or more of metal ions and organic and/or inorganic compounds, said composition being produced by reacting sulfur in the presence of water with an alkali metal hydroxide and/or alkaline earth metal hydroxide in the approximate molar ratio of 0.5–4.0:1, respectively, and having 0.1–2.5 mols per liter of an alkali sulfite salt added after completion of said reaction.

2. The composition according to claim 1, wherein the composition corresponds to general formula (I)

$$M_x S_y O_z \qquad (I)$$

where M represents the alkali metal or alkaline earth metal,
x is 1 or 2,
y is in the range 0.5x–4.0x, and
z is in the range 0.1–2.5.

3. The composition according to claim 1, wherein said alkali sulfite salt is a sodium salt selected from the group consisting of sodium sulfite ($Na_2SO_3$), sodium hydrogen sulfite ($NaHSO_3$), and sodium disulfite ($Na_2S_2O_5$).

4. The composition according to claim 1, wherein said composition further includes polysulfides, polysulfane monosulfonates, polysulfane disulfonates, polysulfane trisulfonates, and/or sulfur.

5. The composition according to claim 1, further containing an aluminum salt.

6. The composition according to claim 5, wherein the aluminum salt is selected from the group consisting of aluminum sulfate and aluminum chloride.

7. The composition according to claim 6, wherein aluminum sulfate is present in the amount of 10–30 g per liter of solution of the composition in water.

8. The composition according to claim 1, further containing a thiosulfate and/or a sulfide.

9. The composition according to claim 8, wherein the composition contains 0.3–0.8 mol per liter of said composition of said thiosulfate and/or sulfide.

10. A method of producing the composition according to claim 1, comprising the step of reacting sulfur with an alkali metal hydroxide or alkaline earth metal hydroxide in the presence of water, with the temperature being kept below the boiling point, and subsequently adding said alkali sulfite salt.

11. The method according to claim 10, wherein water, sulfur, and the alkali metal hydroxide or alkaline earth metal hydroxide are reacted in a molar ratio of 4.0–6.5:0.5–4.0:1.

12. The method according to claim 10, comprising the further step of adding 15–25 g aluminum sulfate per liter of said composition as produced.

13. A method according to claim 10, comprising the further step of forming a slurry of sulfur in water while stirring, following which the alkali metal hydroxide and/or alkaline earth metal hydroxide is added.

14. The method according to claim 10, wherein the sulfur employed contains an additive to resist or prevent caking and encapsulation.

15. The method according to claim 10, comprising the further step of adding aluminum chloride to the composition obtained.

16. The method according to claim 10, wherein a thiosulfate and/or a sulfide is added to the composition obtained.

17. The method for use of the composition according to claim 1, comprising the steps of adding the composition to the water to be purified and of adjusting the pH of the water to be purified to a value in the range 2–12.

18. The method of use of claim 17, wherein the pH of the water is adjusted by adding an inorganic compound containing a multivalent cation of calcium, aluminum, or iron.

19. The method of use of claim 18, wherein the iron compound is an Fe (II) or Fe (III) compound.

20. The method of use of claim 18, wherein the compound containing a multivalent cation is added to the water to be purified either before or after the addition of the composition produced by reacting sulfur with an alkali metal hydroxide or alkaline earth metal hydroxide, but preferably before such addition, and the pH is adjusted to a value in the range of 8.0–11.0.

21. The method of use of claim 17, comprising the further step of subjecting the purified water obtained to oxidative after-treatment and/or an additional precipitation process.

22. The method of use of claim 21, wherein said additional precipitation process is a process to precipitate phosphates and/or fluorides.

23. The method of use according to claim 21, wherein the precipitated metals are toxic and nonferrous heavy metals.

24. The method of use according to claim 17, wherein the inorganic and/or organic impurities to be removed from the water to be purified include hydrocarbons.

25. A method of use of the composition of claim 1 to remove heavy metals from flue gases, comprising the steps of spraying a solution of said composition in water into a stream of said flue gas, and collecting precipitated heavy metal particulates.

* * * * *